United States Patent [19]

Yoshida

[11] Patent Number: 5,442,339

[45] Date of Patent: Aug. 15, 1995

[54] METHOD AND SYSTEM OF CHANGING DESTINATION OF PROTOCOL DATA UNIT IN HIERARCHICAL DATA COMMUNICATION NETWORK SYSTEMS

[75] Inventor: Atsumasa Yoshida, Tokyo, Japan

[73] Assignee: NEC Corporation, Tokyo, Japan

[21] Appl. No.: 97,540

[22] Filed: Jul. 26, 1993

Related U.S. Application Data

[63] Continuation of Ser. No. 730,170, Jul. 16, 1991, abandoned.

[30] Foreign Application Priority Data

Jul. 16, 1990 [JP] Japan ................... 2-187517

[51] Int. Cl.6 ............................................. G05B 23/02
[52] U.S. Cl. ........................... 340/825.16; 340/825.07; 340/825.52
[58] Field of Search ....................... 340/825.16, 825.05, 340/825.07, 825.52, 825.02, 825.15, 825.18; 370/56, 60, 61, 85.8, 95.2, 94.1, 92, 97; 379/210, 211, 212, 213; 358/407

[56] References Cited

U.S. PATENT DOCUMENTS 4,379,946  4/1983  Mizuno et al. ................. 340/825.07
4,816,826  3/1989  Munter et al. ................. 340/825.52
4,875,037  10/1989  Escolar ........................ 340/825.16
4,994,926  2/1991  Gordon et al. ................. 358/405

FOREIGN PATENT DOCUMENTS 0219049  4/9187  European Pat. Off. .

OTHER PUBLICATIONS

Patent Abstracts of Japan, vol. 11, No. 286 (E-541), Sep. 16, 1987. JP 62085532.
Patent Abstracts of Japan, vol. 11, No. 390 (E-567), Dec. 19, 1987. JP 62155649.

Primary Examiner—Donald J. Yusko
Assistant Examiner—Edwin C. Holloway, III
Attorney, Agent, or Firm—Foley & Lardner

[57] ABSTRACT

A relay station is interposed between the end systems and is equipped with a large capacity memory in which a PDU is stored for a given time period in the event that the PDU includes an indication for retaining the same in the memory. Subsequently, when it is noted that the destination of the PDU is erroneously attached, a destination correction PDU is dispatched to the relay station within the given time period. Thus, the PDU is given a correct destination and is redirected to the intended end system.

5 Claims, 3 Drawing Sheets

METHOD AND SYSTEM OF CHANGING DESTINATION OF PROTOCOL DATA UNIT IN HIERARCHICAL DATA COMMUNICATION NETWORK SYSTEMS

This application is a continuation of application Ser. No. 07/730,170, filed Jul. 16, 1991, now abandoned.

BACKGROUND OF THE INVENTION

1. Field of the Invention

The present invention relates generally to a method and arrangement for correcting the destination of a protocol data unit (PDU) in hierarchical data communication network including a layered architecture, and more specifically to such a method and arrangement wherein an erroneously attached destination of a PDU can be corrected while being retained in a relay station.

2. Description of the Prior Art

In previously proposed network systems of a type mentioned above, it has been necessary to provide each of the end systems with a memory so as to enable transmitted data to be temporarily stored, whereby when the data have been erroneously directed, the data can be redirected to the appropriate end system at some later time.

However, when the data to be transmitted involves very large amounts of information, this technique increases the cost and complexity of the overall system.

SUMMARY OF THE INVENTION

It is an object of the present invention to enable transmitted data to be held in a separate memory device which is provided in a relay station and which is shared by a plurality of the end systems and thus obviate the need for each of the end systems to have its own large capacity memory.

In brief, the above object is achieved by an arrangement/method wherein a relay station is equipped with a large capacity memory in which a PDU is stored for a given time period in the event that the PDU includes an indication for retaining the same in the memory. Subsequently, when it is noted that the destination of the PDU is erroneously attached, a destination correction PDU is dispatched to the relay station within the given time period. Thus, the PDU is given a correct destination and is redirected to the intended end system.

More specifically a first aspect of the present invention is deemed to come in an arrangement of changing a destination of a protocol data unit (PDU) in a hierarchical data communications network system, comprising: an end system which forwards a first PDU to another end system along with a destination defined by the first PDU, the first PDU including a destination address which specifies the destination of the first PDU and including a transmission hold indicator, the end system dispatching a second PDU after the first PDU has been forwarded in the event that the destination of the first PDU should be changed, the second PDU including a correct destination address and a target PDU indicator; and a relay station for receiving the first PDU and temporarily storing same therewithin, the relay station continuing to retain the first PDU for a given time period if the transmission hold indicator assumes a first control signal which indicates that the first PDU should be retained within the relay station, the relay station receiving the second PDU and storing same therewithin, the relay station changing the destination of the first PDU in the event that the first PDU is specified by the target PDU indicator within the given time period.

A second aspect of the present invention is deemed to come in a method of changing a destination of a PDU in a hierarchical data communications network system, comprising the steps of: forwarding a first PDU from an end system to another end system along with a destination defined by the first PDU, the first PDU including a destination address which specifies the destination of the first PDU and including a transmission hold indicator; dispatching a second PDU from the end system after the first PDU has been forwarded if the destination of the first PDU should be changed, the second PDU including a correct destination address and a target PDU indicator; receiving, at a relay station, the first PDU and temporarily storing same therewithin; continuing to retain the first PDU, within the relay station, for a given time period if the transmission hold indicator assumes a control signal which indicates that the first PDU should be retained within the relay station; and receiving the second PDU, at the relay station, and storing same therewithin, the destination of the first PDU being changed in the event that the first PDU is specified by the target PDU indicator within the given time period.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
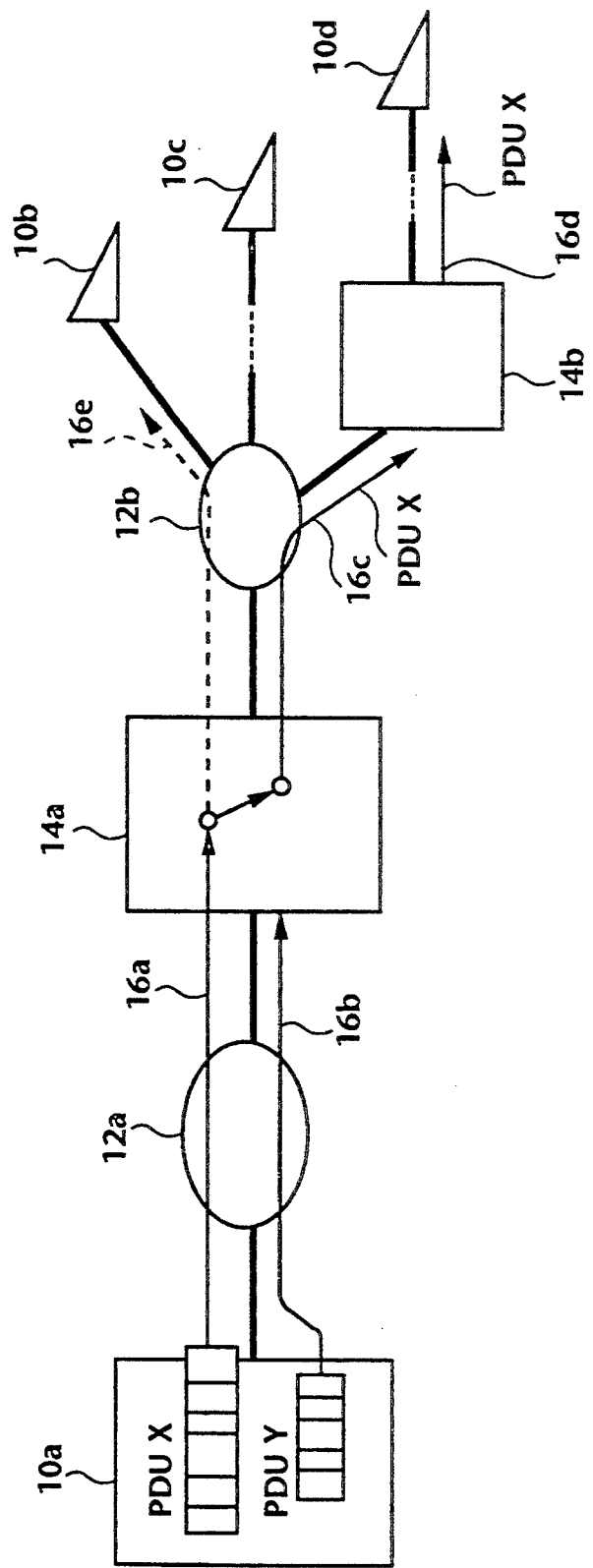
FIG. 1 is a sketch schematically illustrating a network topology to which the instant invention is applicable.

FIG. 1 illustrates in a very simplified manner an example of an overall system to which the present invention is applicable. The system shown in FIG. 1 includes, in this particular embodiment, four end systems 10a, 10b, 10c, 10d, two subnetworks 12a, 12b, and two relay stations 14a, 14b. The end systems 10a–10d are interconnected via bold lines, and are able to exchange data (viz., PDUs) therebetween via the subnetworks 12a–12b and the relay stations 14a–14b.

Before discussing the present invention in detail, a brief description thereof will be given with reference to FIG. 1.

It is assumed that: (a) a PDU sender dispatches, via the end system 10a, a PDU X which has been directed to the end system 10b and (b) the PDU X has included data of a predetermined hold time for which the PDU X is retained in the relay station 14a. When the relay station 14a is supplied with the PDU X, the station 14a retains same therewithin for the predetermined period of time, which ranges from more than 3 minutes to one hour merely by way of example. It is further assumed that, after the PDU X has been forwarded, a sender of the PDU X wishes to change the erroneous destination and dispatches a destination change PDU Y, within the predetermined hold period of time, in order to correctly route the PDU X to the end system 10d.

The relay station in which PDUs are to be stored for the purposes of destination correction, is previously determined when constructing the overall system.

In more specific terms, the PDU X is forwarded, as shown by an arrow 16a, from the end system 10a to the relay station 14a in which the PDU X is held for the predetermined time period. Following this, the destination change PDU Y is forwarded to the relay station 14a as shown by arrow 16b within the predetermined hold time period. Thus, the destination of the PDU X is changed at the relay station 14a from the end system 10b to 10d. Accordingly, when the predetermined hold time expires, the PDU X is routed to the correct end system 10d via the subnetwork 12b and the relay station 14b as shown by arrows 16c, 16d. Contrarily, in the event that the end system 10a fails to forward the destination change PDU Y before the predetermined hold time expires at the relay station 14a, the PDU X is erroneously routed to the end system 10b as indicated by the broken line arrow 16e.

Figure 2:
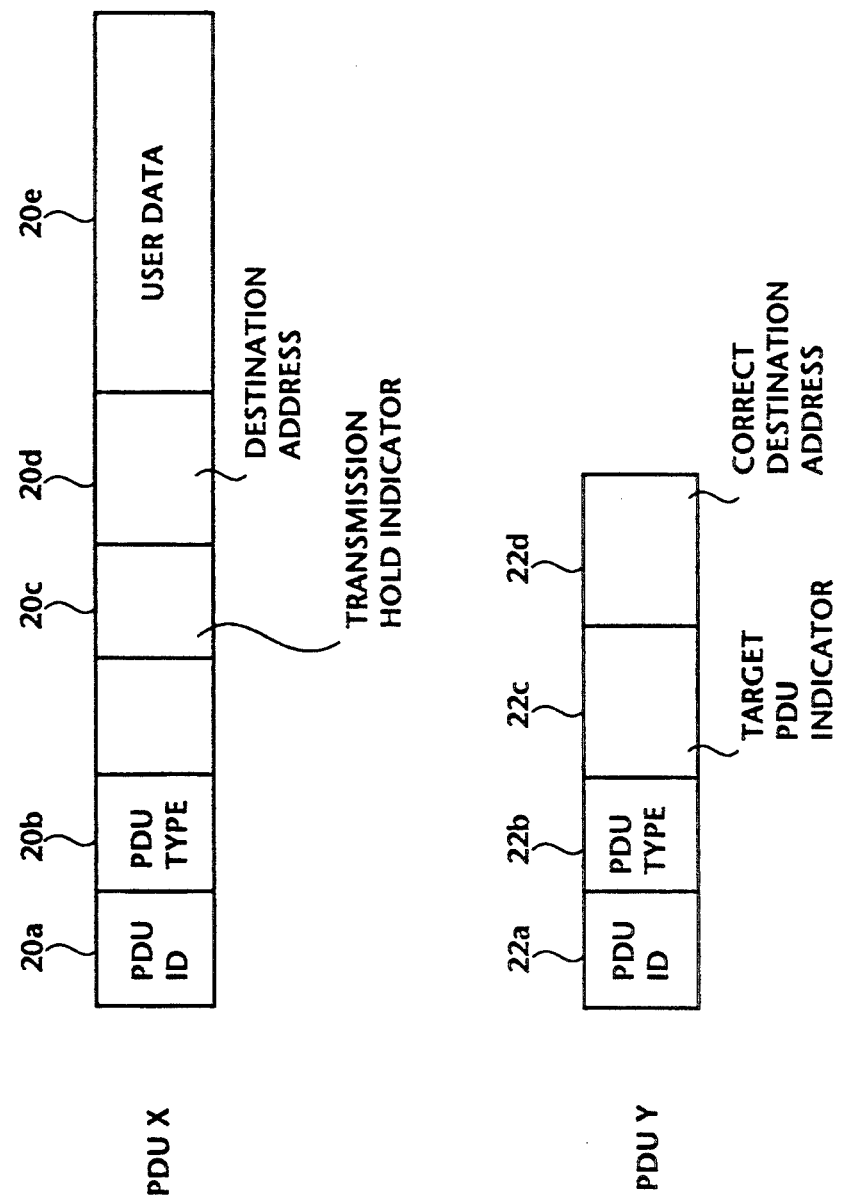
FIG. 2 shows a format of each of two kinds of PDUs employed in the instant invention.

FIG. 2 shows a code format of each of the PDUs X and Y. As shown, the PDU X includes a PDU ID (Identification) code 20a, a PDU type code 20b, a transmission hold indicator 20c which indicates whether or not the PDU should be retained in a designated relay station, a destination address code 20d and a user data section 20e. If the indicator 20c holds a logic "1", the PDU is retained in the relay station 14a for the predetermined time period, while if the indicator 20c holds a logic "0" then the PDU will not be held in the relay station 14a and is dispatched to an end station as instructed. On the other hand, the destination change PDU Y includes a PDU ID code 22a, a PDU type code 22b, a target PDU indicator 22c and a correct destination address code 22e. The target PDU indicates, in this particular embodiment, the PDU X whose destination address should be corrected by the PDU Y. In the instant invention, the PDU type code 20b represents that the PDU including same is a type containing user data, while the PDU type code 22b indicates that the PDU is for the destination change.

Figure 3:
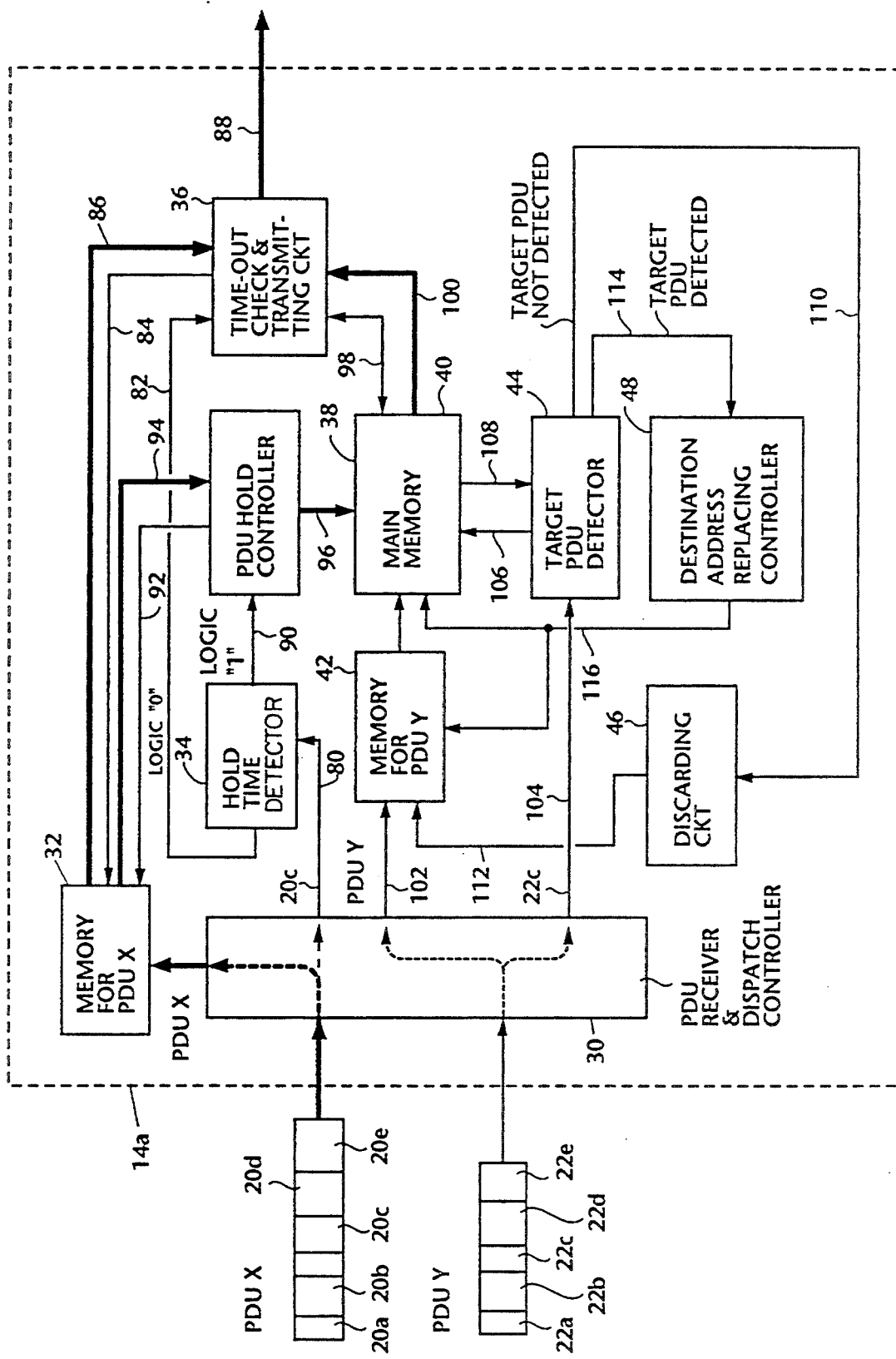
FIG. 3 is a block diagram showing in detail one block of the arrangement shown in FIG. 1.

Reference is now made to FIG. 3, wherein the relay station 14a is shown in detail in block diagram form. In FIG. 3, each of the bold lines indicates a flow of the PDU X, while each of slim lines indicates a flow of control.

A PDU receiver and dispatch controller 30 is supplied with the PDU X and directs same to a memory 32 which stores the PDU X. The controller 30 extracts and applies the transmission hold indicator 20c (FIG. 2), included in the PDU X received, to a hold time detector 34 via a line 80.

In the event that the transmission hold indicator 20c assumes a logic "0", the hold time detector 34 applies a control signal to a time-out check and transmitting circuit 36 via a control line 82. As previously mentioned, a logic "0" stored in the hold time indicator 20c indicates that the PDU X is not retained in the relay station 14a and, accordingly, the circuit 36 fetches the PDU X stored in the memory 32 via lines 84 and 86. Thus, the PDU X is directed to the subnetwork 12b (FIG. 2) via a line 88. The end system 10a usually attaches to the PDU X the transmission hold indicator 20c which assumes a logic "1". However, in the event of high traffic density (for example), the end system 10a controls such that the indicator 20c assumes a logic "0".

On the other hand, if the hold time indicator 20c assumes a logic "1", a PDU hold controller 38, in response to a control signal outputted from the hold time detector 34 and appearing on a line 90, accesses the memory 32 via a line 92 and has the PDU X transferred to and stored in a main memory 40 via lines 94, 96. When the PDU hold controller 38 writes the PDU X into the main memory 40, it attaches a time count data to the PDU X and increments the time count data up to the predetermined hold time. The main memory 40 has a memory capacity sufficient to memorize a large amount of PDUs. It should be noted that each of the PDUs stored in the main memory 40 is assigned the aforesaid time count data which is controlled by the PDU hold controller 38.

The time-out check and transmitting circuit 36 checks to see, using a line 98, if there exists a PDU whose hold time exceeds the predetermined hold time period. In the event that the PDU X in question has been held in the main memory exceeding the predetermined time period, the circuit 36 determines the overtime storage of the PDU X within the main memory 40 and retrieves same via a line 100. Subsequently, the retrieved PDU X is forwarded to the subnetwork 12b (FIG. 1) via the line 88 under the control of the time-out check and transmitting circuit 36.

Turning to the destination change PDU Y. When the PDU receiver and dispatch controller 30 is supplied with the PDU Y, it applies same to a memory 42 via a line 102. The memory 42 stores the whole of the PDU Y inputted to the relay station 14a. The controller 30 simultaneously supplies a target PDU detector 44 with the target PDU indicator 22c (FIG. 2) via a line 104. The detector 44 checks to see if the target PDU specified by the target PDU indicator 22c applied from the controller 30, is stored in the main memory 40 or not via lines 106, 108. In the event that the detector 44 fails to find the PDU defined by the target PDU indicator 22c, the detector 44 supplies, via a line 110, a discarding circuit 46 with a control signal indicating that the target PDU has not been found. Following this, the discarding circuit 46 erases the PDU Y via a line 112.

On the other hand, if the target PDU detector 44 finds the target PDU in the main memory 40, a destination address replacing controller 48 receives, via a line 114, a control signal indicating that the target PDU has been detected. Subsequently, the controller 48 retrieves the PDU Y from the memory 42 and replaces the original destination address included in the corresponding PDU (viz, PDU X in this case) with the one in the PDU Y, using a line 116. The PDU X which has been subject to the destination address renewal, is transmitted to the subnetwork 12b via the lines 100, 88 when the hold time assigned thereto lapses, the manner of which has been discussed in the above.

In the above description, the end system 10a dispatches the PDUs X and Y. However, it goes without saying that the same discussion is applicable to any of the other end systems 10b–10d. Further, according to the forgoing, the transmission hold indicator 20c assumes a logic "1" or "0". However, the indicator 20c may assumes one of various values each of which indicates the hold time duraton. The value of the indicator 20c is set to an appropirate one depending on traffic conditions. By way of example, during heavy traffic, the value is set to a small one.

While the foregoing description describes only a single embodiment according to the present invention, the various alternatives and modifications possible without departing from the scope of the present invention, which is limited only by the appended claims, will be apparent to those skilled in the art.

What is claimed is:

1. A hierarchical data communications network system, including a relay station for changing a destination of a protocol data unit (PDU) and a first end system coupled to forward a first PDU to one of a plurality of destination end systems via said relay station, said first PDU including a destination address which specifies the destination end system of said first PDU and a transmission hold indicator, said first end system also being coupled to dispatch a destination change PDU to said relay station after said first PDU has been forwarded to said relay station, said destination change PDU including a destination change address and a target PDU indicator, said relay station comprising:
   first means for receiving and temporarily storing said first PDU, and for continuing to retain said first PDU for a given time period if said transmission hold indicator indicates that said first PDU should be retained within said relay station; and
   second means for receiving and storing said destination change PDU and for changing the destination of said first PDU in the event that said first PDU is specified by the target PDU indicator within the given time period.

2. A hierarchial data communications network system as claimed in claim 1, wherein said relay station further includes:
   third means for receiving said first PDU and said destination change PDU, said third means being operatively coupled to said first and second means;
   fourth means for storing said first PDU for the given time period;
   fifth means coupled to said third means for checking to see if said first PDU holds said transmission hold indicator;
   sixth means coupled to said first, fourth and fifth means for transferring said first PDU stored in said first means to said fourth means if said fifth means detects said transmission hold indicator;
   seventh means for determining if the PDU defined by said target PDU indicator exists within said fourth means,
   wherein said second means receives said destination change PDU via said third means and stores said destination change PDU and is coupled to said fourth means and wherein said first PDU stored in said fourth means is subject to a destination address removal in the event that said seventh means determines that the PDU defined by said target PDU indicator exists within said fourth means.

3. A hierarchial data communications network system as claimed in claim 2, wherein said relay station further includes:
   eighth means coupled to said first and fifth means for dispatching said first PDU stored in said first means from said relay station in the event that said fifth means detects that said transmission hold indicator indicates that said first PDU should be forwarded without being retained within said relay station, said eighth means being further coupled to said fourth means for retrieving said first PDU from said fourth means and dispatching said first PDU from said relay station when the given time period expires.

4. A hierarchical data communications network system as claimed in claim 3, wherein said relay station further includes:
   ninth means coupled to said fourth, second and seventh means, said ninth means implementing said destination address renewal in the event that said seventh means determines that the PDU defined by said target PDU indicator exists within said third means;
   tenth means coupled to said second and seventh means for discarding said second PDU in said second means in response to said second control signal in the event that said seventh means determines that the PDU defined by said target PDU indicator does not exist within said fourth means.

5. A method of changing a destination of a protocol data unit (PDU) in a hierarchical communications network system, comprising the steps of:
   forwarding a first PDU from a first end system to a relay station for transmission to another end system in connection with a destination defined by said first PDU, said first PDU including a destination address which specifies the destination of said first PDU and including a transmission hold indicator;
   dispatching a destination change PDU including a target PDU indicator and a destination address code from said first end system after said first PDU has been forwarded to said relay station;
   receiving, at said relay station, said first PDU and temporarily storing same therewithin;
   retaining said first PDU, within said relay station for a given time period if said transmission hold indicator indicates that said first PDU is to be retained within said relay station;
   receiving and storing said destination change PDU at said relay station; and
   changing the destination of said first PDU to said destination address code of said destination change PDU in the event that said first PDU is specified by the target PDU indicator within the given time period.

* * * * *